(12) United States Patent
Jia (10) Patent No.: US 8,515,164 B2
(45) Date of Patent: Aug. 20, 2013

(54) NON-PRODUCT IMAGE IDENTIFICATION (75) Inventor: Menglei Jia, Hangzou (CN)

(73) Assignee: Alibaba Group Holding Limited (KY)

( * ) Notice: Subject to any disclaimer, the term of this patent is extended or adjusted under 35 U.S.C. 154(b) by 501 days.

(21) Appl. No.: 12/803,599

(22) Filed: Jun. 30, 2010

(65) Prior Publication Data
US 2011/0002535 A1    Jan. 6, 2011

(30) Foreign Application Priority Data

Jul. 2, 2009   (CN) .......................... 2009 1 0149552

(51) Int. Cl.
*G06K 9/00*  (2006.01)

(52) U.S. Cl.
USPC ........................................ 382/165

(58) Field of Classification Search
USPC ................ 382/162, 164, 165, 194, 181, 224, 382/173, 141–152, 305, 100
See application file for complete search history.

(56) References Cited

U.S. PATENT DOCUMENTS

| | | | |
|---|---|---|---|
| 5,035,059 A | 7/1991 | Takahashi et al. | |
| 5,134,666 A | 7/1992 | Imao et al. | |
| 5,420,938 A | 5/1995 | Funada et al. | |
| 5,493,386 A | 2/1996 | Thompson | |
| 6,035,074 A | 3/2000 | Fujimoto et al. | |
| 6,108,098 A | 8/2000 | Owada et al. | |
| 6,778,697 B1 * | 8/2004 | Shin et al. | 382/164 |
| 7,006,708 B1 | 2/2006 | Nako et al. | |
| 7,016,532 B2 * | 3/2006 | Boncyk et al. | 382/165 |
| 7,120,296 B2 | 10/2006 | Shimoyama | |
| 2004/0170318 A1 | 9/2004 | Crandall et al. | |

FOREIGN PATENT DOCUMENTS

| | | |
|---|---|---|
| CN | 101231757 A | 7/2008 |
| CN | 101281521 A | 10/2008 |

OTHER PUBLICATIONS

Swain et al., "Color Indexing", International Journal of Computer Vision, 7:1, 11-32 (1991), pp. 13-16, 21-23.

* cited by examiner

*Primary Examiner* — Ishrat I Sherali
(74) *Attorney, Agent, or Firm* — Van Pelt, Yi & James LLP (57) ABSTRACT

An image recognition technique includes obtaining color characteristic values of pixels in a source image; determining a main color of the source image based at least in part on the color characteristic values; and determining whether the source image is a non-product image based at least in part on the main color of the source image.

18 Claims, 5 Drawing Sheets

NON-PRODUCT IMAGE IDENTIFICATION

CROSS REFERENCE TO OTHER APPLICATIONS

This application claims priority to People's Republic of China Patent Application No. 200910149552.8 entitled IMAGE RECOGNITION METHOD AND DEVICE filed Jul. 2, 2009 which is incorporated herein by reference for all purposes.

FIELD OF THE INVENTION

The present application relates to the field of image processing and in particular to image recognition.

BACKGROUND OF THE INVENTION

The development of multimedia technologies has enriched information presentation in software applications. Many image processing techniques have been developed for computer applications and especially for the Internet.

Taking an electronic commerce application as an example, existing electronic commerce systems generally support the function of attaching a picture to a product. A vendor publishing his product offerings over the network can upload pictures of the product in addition to textual descriptions. An image can exhibit a product more intuitively than mere text and, in most cases, the picture of a product can also be an important criterion based upon which a buyer confirms authenticity of information on the product.

For a majority of categories of products, a real photograph of a product should ideally be used as a picture of the product because the real photograph shows the appearance and property of the product intuitively. Some vendors, however, often upload irrelevant pictures such as an advertisement for the vendor, a sale record, a picture that includes a user manual, etc., which do not accurately reflect the properties of the product itself. Furthermore, such pictures hinder the efforts of data mining by the website owners and prevent effective categorization of products based on their appearances. Moreover, some website owners may wish to classify images unrelated to the actual products differently from images depicting products. Techniques for identifying and distinguishing different types of images are needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
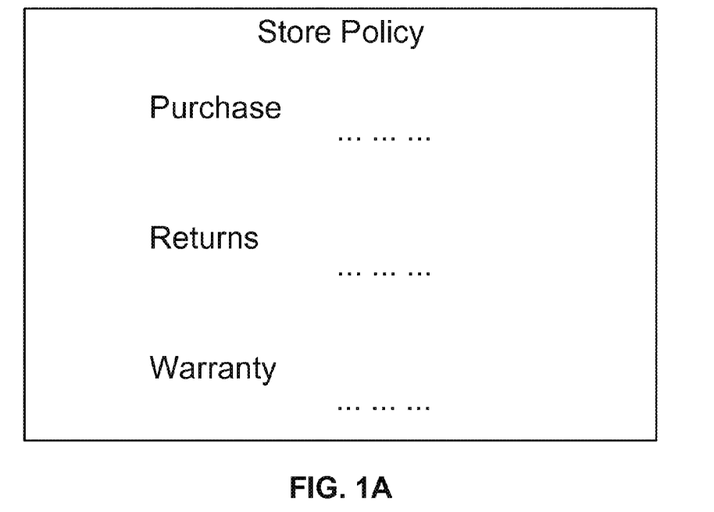
FIGS. 1A and 1B illustrate examples of non-product images.
Figure 1B:
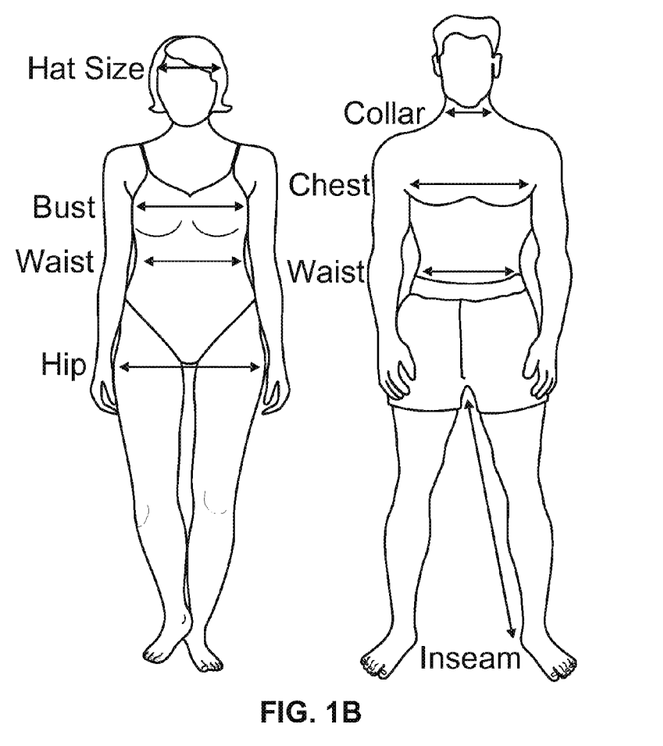

FIGS. 1A and 1B illustrate examples of non-product images found on an electronic commerce website. FIG. 1A illustrates an image displaying a store policy and FIG. 1B illustrates a sizing chart image for measuring clothes. These pictures do not depict the product for sale and therefore are considered as non-product images if included along with information for the product. In some existing systems, non-product images are recognized manually and removed.

In the following specification, an automated image analysis technique for identifying non-product images is disclosed. In some embodiments, one or more color features of the image, such as a main color of the image or main colors of sub-blocks of the image, are obtained and used to determine whether the image is a non-product image. In some embodiments, one or more rules are applied to the color features to make the determination.

Figure 2:
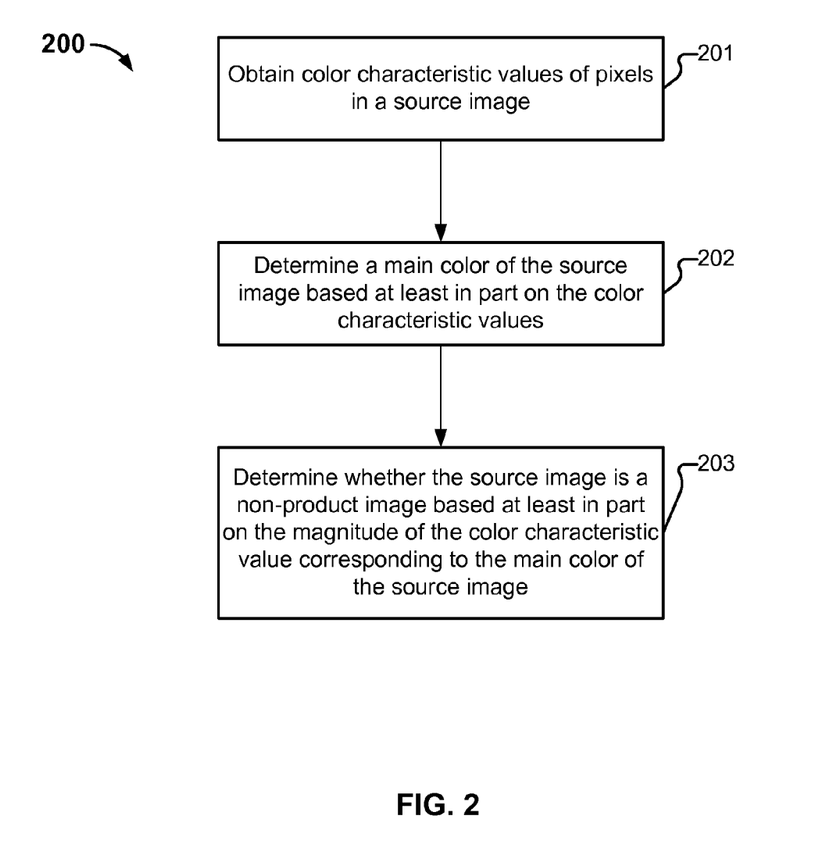
FIG. 2 is a flowchart illustrating an embodiment of an image recognition process.

FIG. 2 is a flowchart illustrating an embodiment of an image recognition process. Process 200 may be performed on a system such as system 600 of FIG. 6. The process can be described in a general context of computer executable instructions, e.g., a program module, executed by a computer. Generally, the program module includes a routine, program, object, component, data structure, etc., which executes a specific task or embodies a specific abstract type of data. The process can also be implemented in a distributed computing environment in which a task is executed by a remote processing device connected via a communication network. In the distributed computing environment, the program module can be located in a local or remote computer storage medium including a storage device.

At 201, color characteristic values of pixels in a source image are obtained. It is assumed that the source image is a color image rather than a binary or gray scale image. In some embodiments, the color characteristic values are obtained by reading from the source image file. In some embodiments, the color characteristic values are received from a sender such as an image server used to store the source image file. In some embodiments, the source image is optionally converted to be recognized into a uniform format and scaled into a uniform size before the color characteristic values are acquired.

As used herein, a color model is a mathematical model describing the way colors can be represented as tuples of numbers, typically as three or four components. RGB and CMYK are examples of commonly used color models. Adding a mapping function between the color model and a certain reference color space results in a definite "footprint" within the reference color space. In a three-dimensional color space, the three-dimensional coordinate axes correspond to three independent color parameters so that each color has a corresponding space position and vice versa. A point in the space corresponds to a specific color. For instance, when colors are displayed on a computer monitor, they are usually defined in the RGB (red, green, blue) color space. This is another way of making nearly the same colors (limited by the reproduction medium, such as the phosphor (CRT) or filters and backlight (LCD)), and red, green, blue can be considered as the X, Y, and Z axes. Another way of making the same colors is to use their Hue (X axis), their Saturation (Y axis), and their brightness Value (Z axis). This is called the HSV color space. Other color space examples include YUV, YCbCr, etc. Many color spaces can be represented as three-dimensional (X, Y, Z) values in this manner.

RGB-based color model is discussed extensively in the following discussion for purposes of illustration. Other color models can be used as well. For example, colors black and white are typically represented using 0 and 1, respectively, in a binary image comprising black and white pixels only; and the color characteristic value of a pixel in a grey scale image is presented with a grey scale value. Values of the black and white colors and gray scale values can be regarded as special cases of a RGB value with a conversion relationship with the RGB value. Moreover, for a color image, its color can be represented variously as derived from RGB, e.g., a value of YCrCb (Brightness/Hue/Saturation), etc.

At 202, a main color of the source image is determined based at least in part on the color characteristic values. In some embodiments, for each color characteristic value, the number of pixels corresponding to the color characteristic value is counted. The results are compared to determine the main color of the source image. As used herein, a main color refers to a color with the highest frequency of occurring in the image. In other words, it is the color that corresponds to the color characteristic value that has the highest pixel count.

At 203, it is determined whether the source image is a non-product image based at least in part on the magnitude of the color characteristic value corresponding to the main color of the source image. In some embodiments, multiple rules are applied to make the determination. Examples of the rules are described in greater detail below.

The non-product image may be handled in various ways. For example, the non-product image may be automatically deleted from the product information with which the image is associated, or a warning may be sent to the user who uploaded the non-product image. In some embodiments, confirmation by a human (such as a system administrator) or by an additional image processing system is needed before the non-product image is deleted. In some embodiments, non-product images are classified into a different image category than product images depicting the product.

Figure 3:
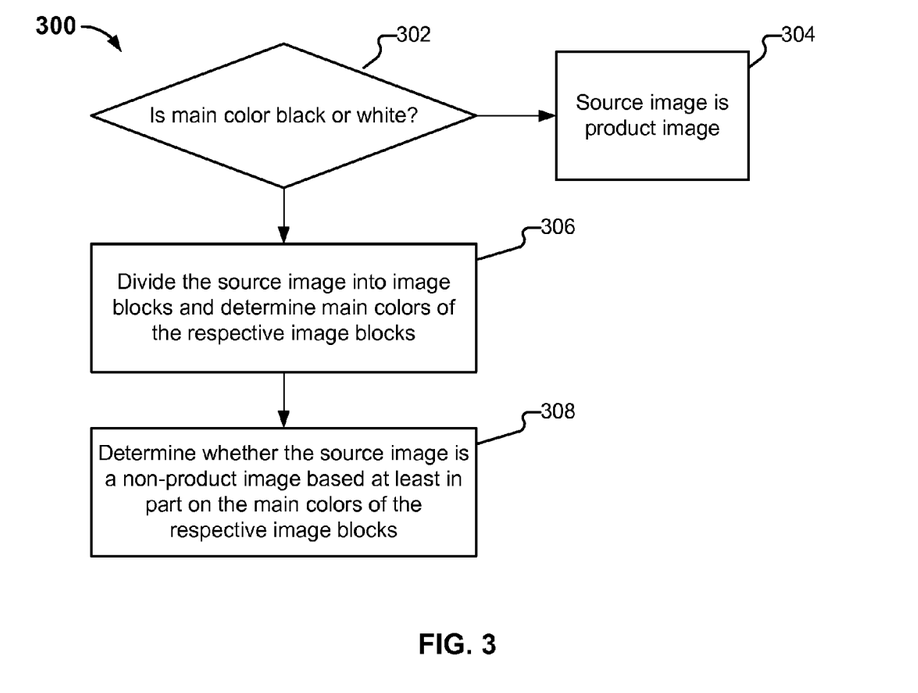
FIG. 3 is a flowchart illustrating an embodiment of a process for determining whether a source image is a non-product image.

FIG. 3 is a flowchart illustrating an embodiment of a process for determining whether a source image is a non-product image. Process 300 may be used to implement step 203 of FIG. 2. In the example shown, the process applies several rules to make determination of whether a source image is a non-product image.

Initially, a general rule is applied for making a preliminary determination based on the determined main color of the source image. Generally, a color source image with a main color other than black or white can be considered as a product image, or conversely, a color source image with a main color of black or white will have a great probability of being a non-product image. Thus, at 302, it is determined whether the main color is black or white.

In some embodiments, a color is deemed to be black if it has a color characteristic value that is below a threshold A, and a color is deemed to be white if its color characteristic value that is above a threshold B. A set of colors with a color characteristic value between A and B are referred collectively to as "other colors". A and B take on specific values depending upon how to quantize a color space may vary depending on implementation.

If the main color is neither black nor white, at 304, the source image is deemed to be a product image. Otherwise, additional rules are applied. Specifically, at 306, the source image is divided into several image blocks and main colors of the respective image blocks are determined according to the number of pixels corresponding to respective color characteristic values in the respective image blocks.

At 308, whether the source image is a non-product image is determined based at least in part on the main colors of the respective image blocks. The determination process of a main color of an image block is similar to that for determining the main color of the source image as a whole. By dividing an image into several blocks and determining the non-product image status based on the distribution of colors in the image blocks can more accurately determine whether an image is a non-product image.

For example, when the main color of the source image is black or white, determination can further be performed according to the number of image blocks with a specific main color and/or the relative position of an image block with a specific main color in the source image.

In this example, the source image is RGB based and there are 8 different levels of intensity for each of the three primary colors of R (Red), G (Green) and B (Blue). Thus, the color characteristic value ranges from RGB000 to RGB777 and the entire color space is quantized into 512 colors. For example, RGB235 represents an intensity value 2 for red color, an intensity value 3 for green color, and an intensity value 5 for blue color.

In this example, some specific colors are defined as follows according to the foregoing method for quantizing a color space for later convenient descriptions: a color with each of R, G, and B values less than or equal to 1 is defined as black; a color with each of R, G and B values greater than or equal to 6 is defined as white. Black and white are further specified as follows:

RGB000 represents pure black;
RGB001, RGB010, RGB011, RGB100, RGB101 and RGB110 represent dark black;

RGB666, RGB667, RGB676 and RGB766 represent dark white; more particularly, RGB 666 also represents grey white;

RGB777, RGB677, RGB767 and RGB776 represent bright white; and RGB 777 also represents pure white.

Based on characteristics of the human visual system, the present embodiment introduces the concept of a valid color for more reasonable and accurate recognition. If the ratio of the number of pixels with non-gray color to the number of all the pixels is above a threshold, the color can be regarded as a valid color. Valid colors are primarily used for measuring the degree to which an image is colorful. As used herein, gray color is defined as a color with equal values of R, G, and B. As can be seen, the pure black (RGB000), grey white (RGB666) and pure white (RGB777) defined as above also fall into the category of grey color. In practice, a color with equal values of R, G, and B is typically a dark color and therefore the present embodiment also takes into account such a category of color. The threshold is set for the purpose of neglecting some colors seldom occurring in the image and experimental data demonstrates that the threshold can be set as approximately 5/1000. Other threshold values may be used.

Figure 4:
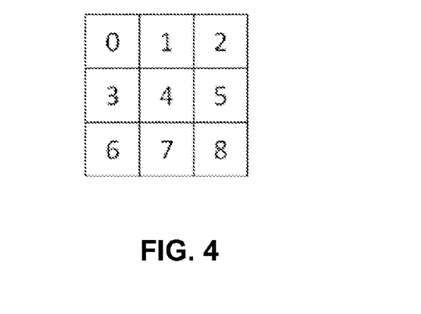
FIG. 4 is a diagram illustrating an example of a source image divided into blocks for determining whether the image is a non-product image.

FIG. 4 is a diagram illustrating an example of a source image divided into blocks for determining whether the image is a non-product image. In this example, the image is divided into 9 image blocks according to a 3×3 grid layout. This division ensures that colors on the sides, corners, and the center of the source image are evaluated separately and avoids overly complicated determination rule to improve recognition speed. Other divisions are possible in other embodiments.

In this example, the source image is divided into 9 image blocks which are denoted sequentially with "a block 0", "a block 1", . . . "a block 8" from the left to the right and the top to the bottom as illustrated in FIG. 4 for convenient descriptions. Main colors of the respective image blocks are determined respectively.

Figure 5:
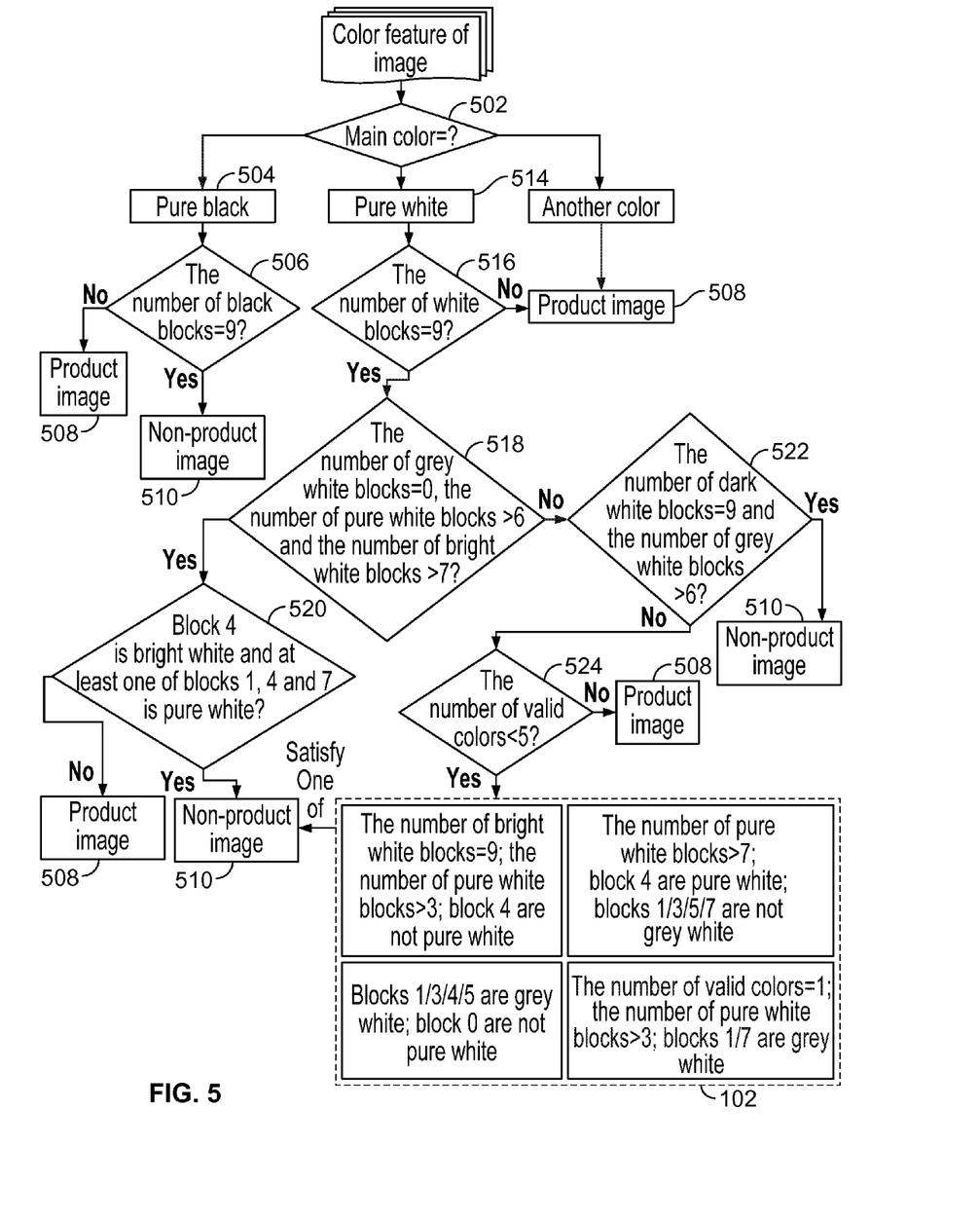
FIG. 5 is a flowchart illustrating an embodiment of a process for determining whether a source image is non-product based on its image blocks.

FIG. 5 is a flowchart illustrating an embodiment of a process for determining whether a source image is a non-product image based on its image blocks. Process 500 may be used to implement 308 of FIG. 3.

At 502, it is determined whether the main color of the source image is pure black, pure white, or something else.

If, at 530, it is determined that the main color of the source image is neither pure black nor pure white, then it is a product image.

If, at 504, the main color of the source image is determined to be pure black, it is possibly unrelated to the product and it is further determined whether the main colors of all nine image blocks are black, at 506. If so, the image is deemed to be a non-product image at 508; otherwise, it is deemed to be a product image at 510.

If, at 516, the main color of the source image is determined to be pure white, it is further determined, at 518, whether all the main colors of the nine image blocks are white. If no, the image is deemed to be a product image at 508. Otherwise, at 518, it is determined whether the number of grey-white blocks is 0, the number of pure white blocks is greater than 6 and the number of bright white blocks is greater than 7. If so, control is transferred to 520; otherwise, control is transferred to 522.

At 520, it is determined whether block 4 is bright white, and at least one of the blocks 1, 4 and 7 is pure white. If so, the image is deemed to be a non-product image at 510; otherwise, it is a product image at 508.

At 522, it is determined whether the number of dark white blocks is 9 and the number of grey white blocks is greater than 6. If so, the image is a non-product image; otherwise, further determination is performed. At 524, it is determined whether the number of valid colors is less than 5, and if yes, the image is a product image; otherwise, it is determined, at 526, whether any of the following conditions (a-d) is satisfied. If so, it is a non-product image; otherwise, it is a product image. Conditions a-d include: (a) the number of bright white blocks is 9, the number of pure white blocks is 3, and block 4 is not pure white; (b) the number of pure white blocks is more than 7, block 4 is pure white, and blocks 1, 3, 5 and 7 are not grey white; (c) the number of valid colors is 1, the number of pure white blocks is 3, and blocks 1 and 7 are grey white; (d) blocks 1, 3, 4 and 5 are all grey white, and the block 0 is not pure white.

Process 500 will be described below in connection with the images shown in FIGS. 1A and 1B.

FIG. 1A illustrates an image with a main color of pure white and fewer than five valid colors. When divided according to the scheme shown in FIG. 4, the color characteristic values of respective image blocks are illustrated below:

| 666 | 666 | 666 |
| 666 | 666 | 666 |
| 666 | 666 | 666 |

According to process 500, at 516, the number of white blocks is 9. Thus, at 518, it is determined whether the number of grey white blocks is 0, the number of pure white blocks is greater than 6, and the number of bright white blocks is greater than 7. Since the answer is no, it is determined whether the number of dark white blocks is 9 and whether the number of grey white blocks is greater than 6. In this case, the condition is true, thus the image is determined to be a non-product image.

FIG. 1B illustrates an image with a main color of pure white and fewer than five valid colors. When divided according to the scheme shown in FIG. 4, the color characteristic values of respective image blocks are illustrated below:

| 777 | 777 | 777 |
| 777 | 777 | 777 |
| 777 | 777 | 777 |

According to process 500, it is determined at 514 that the number of white blocks is 9. It is further determined at 518 whether the number of grey white blocks is 0, the number of pure white blocks is greater than 6 and the number of bright white blocks is greater than 7. In this case the answer is yes, thus it is determined at 520 whether block 4 is bright white and at least one of blocks 1, 4, and 7 is pure white. These conditions are also true, thus the image is deemed to be non-product.

The foregoing solution applies a digital image analysis technique to firstly extract a color feature of the image and then determine whether the image is a non-product image in combination with a predetermined determination rule to automatically distinguish a non-product image from a product image among pictures of a product so that the system can process them differently. Of course, the determination rule described in the present embodiment is merely a specific rule derived from real data, those skilled in the art can define various determination rules according to different application demands and the application will not be limited in this respect.

The technical solution according to the application can be applied to the stage of uploading a picture from the user and upon detection of the picture uploaded from the user being a non-product image, the system can reject to accept the picture or feed a message back to the user uploading the non-product image and prompt him to re-upload it to thereby ensure validity of the picture in the system. The foregoing solution can also be applied prior to data mining to reduce influence upon the data mining by precluding a non-product image. Also the recognized non-product image can be cleared to save a storage space of the system.

Figure 6:
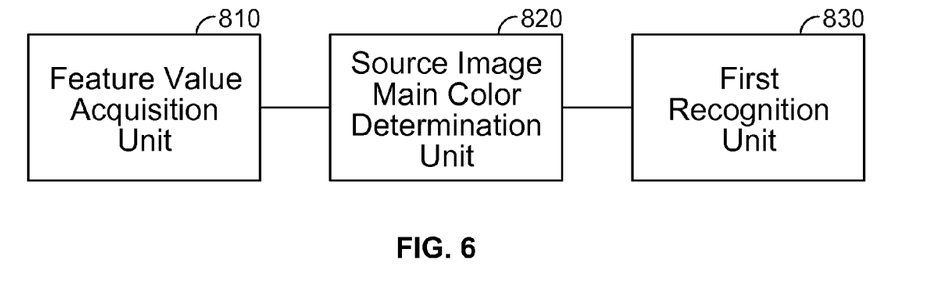
FIG. 6 is a block diagram illustrating an embodiment of a system configured to recognize non-product images.

FIG. 6 is a block diagram illustrating an embodiment of a system configured to recognize non-product images. System 600 may be implemented using one or more computing devices such as a personal computer, a server computer, a handheld or portable device, a flat panel device, a multi-processor system, a microprocessor based system, a set-top box, a programmable consumer electronic device, a network PC, a minicomputer, a large-scale computer, a special purpose device, a distributed computing environment including any of the foregoing systems or devices, or other hardware/software/firmware combination that includes one or more processors, and memory coupled to the processors and configured to provide the processors with instructions.

In the example shown, system 600 includes a feature value acquisition unit 810 adapted to obtain color characteristic values of respective pixels in a source image. It further includes a source image main color determination unit 820 adapted to determine a main color of the source image. In some embodiments, the main color determination unit is configured to count the number of the pixels corresponding to the respective color characteristic values and make the determination based on the counting result. Also included is a first recognition unit 830 adapted to recognize whether the source image is a non-product image based on the color characteristic value of main color of the source image.

Figure 7:
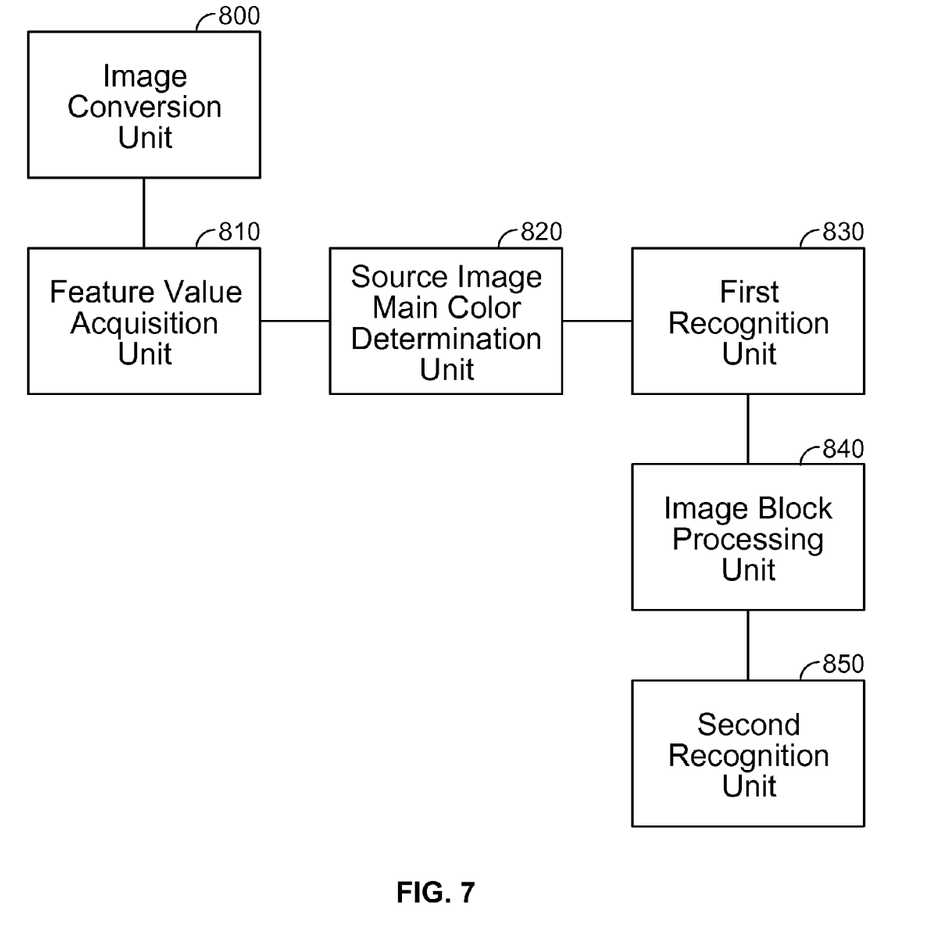
FIG. 7 is a block diagram illustrating another embodiment of a system configured to recognize non-product images.

FIG. 7 is a block diagram illustrating another embodiment of a system configured to recognize non-product images. Similar to system 600, system 700 also includes feature value acquisition unit 810, main color determination unit 820, and first recognition unit 830. It further includes an image conversion unit 800 adapted to convert the source image into a preset format before the characteristic value acquisition unit 810 acquires the characteristic values and an image block processing unit 840 adapted to divide the source image into several image blocks and to determine main colors of the respective image blocks. In addition it includes a second recognition unit 850 adapted to recognize whether the source image is a non-product image according to the main colors of the respective image blocks.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The units may be implemented on a single device or distributed across multiple devices. The functions of the units may be merged into one another or further split into multiple sub-units.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An image recognition method, comprising:
obtaining color characteristic values of pixels in a source image;
determining a main color of the source image based at least in part on the color characteristic values; and
determining whether the source image is a non-product image based at least in part on the main color of the source image, including:
performing a preliminary determination of whether the source image is likely to be a non-product image based at least in part on the main color of the source image;
in the event that it is determined that the source image is likely to be a non-product image:
dividing the source image into a plurality of image blocks;
determining main colors of the respective image blocks; and
determining whether the source image is a non-product image based at least in part on the main colors of the respective image blocks.

2. The method of claim 1, wherein determining the main color of the source image includes determining number of pixels corresponding to the color characteristic values of pixels in the source image and identifying a color that corresponds to the color characteristic value that has the highest pixel count.

3. The method of claim 1, wherein determining whether the source image is a non-product image based at least in part on the main colors of the respective image blocks includes determining whether the source image is a non-product image based at least in part on number of image blocks with a specific main color.

4. The method of claim 1, wherein determining whether the source image is a non-product image based at least in part on the main colors of the respective image blocks includes determining whether the source image is a non-product image based at least in part on a relative position of an image block with a specific main color in the source image.

5. The method of claim 1, wherein dividing the source image into a plurality of image blocks comprises dividing the source image into nine image blocks in a 3×3 layout.

6. The method of claim 1, further comprising converting the source image according to a preset format; and wherein obtaining the color characteristic values of the pixels in the source image comprises acquiring the color characteristic values of the pixels in the converted format.

7. The method of claim 1, wherein the color characteristic values are RGB values.

8. An image recognition method, comprising:
obtaining color characteristic values of pixels in a source image;
determining a main color of the source image based at least in part on the color characteristic values; and
determining whether the source image is a non-product image based at least in part on the main color of the source image; including:
determining whether the main color is black or white;
in the event that the main color is neither black nor white, recognizing the source image as a product image;
in the event that the main color is black or white:
dividing the source image into nine image blocks of a 3×3 layout and recognizing whether the source image is a non-product image according to the number of image blocks with a specific main color.

9. An image recognition method, comprising:
obtaining color characteristic values of pixels in a source image;
determining a main color of the source image based at least in part on the color characteristic values; and
determining whether the source image is a non-product image based at least in part on the main color of the source image; including:
determining whether the main color is black or white;
in the event that the main color is neither black nor white, recognizing the source image as a product image;
in the event that the main color is black or white:
dividing the source image into nine image blocks of a 3×3 layout and
recognizing whether the source image is a non-product image according to a relative position of an image block with a specific main color in the source image.

10. An image recognition system comprising:
one or more processors configured to:
obtain color characteristic values of pixels in a source image;
determine a main color of the source image based at least in part on the color characteristic values; and
determine whether the source image is a non-product image based at least in part on the main color of the source image, including to:
perform a preliminary determination of whether the source image is likely to be a non-product image based at least in part on the main color of the source image;
in the event that it is determined that the source image is likely to be a non-product image, to:
divide the source image into a plurality of image blocks;
determine main colors of the respective image blocks; and
determine whether the source image is a non-product image based at least in part on the main colors of the respective image blocks; and
one or more memories coupled to the one or more processors, configured to provide the one or more processors with instructions.

11. The system of claim 10, wherein determining the main color of the source image includes determining number of pixels corresponding to the color characteristic values of pixels in the source image and identifying a color that corresponds to the color characteristic value that has the highest pixel count.

12. The system of claim 10, wherein determining whether the source image is a non-product image based at least in part on the main colors of the respective image blocks includes determining whether the source image is a non-product image based at least in part on number of image blocks with a specific main color.

13. The system of claim 10, wherein determining whether the source image is a non-product image based at least in part on the main colors of the respective image blocks includes determining whether the source image is a non-product image based at least in part on a relative position of an image block with a specific main color in the source image.

14. The system of claim 10, wherein dividing the source image into a plurality of image blocks comprises dividing the source image into nine image blocks in a 3×3 layout.

15. The system of claim 10, wherein the one or more processors are further configured to:
convert the source image according to a preset format; and
wherein obtaining the color characteristic values of the pixels in the source image comprises acquiring the color characteristic values of the pixels in the converted format.

16. An image recognition system comprising:
one or more processors configured to:
obtain color characteristic values of pixels in a source image;
determine a main color of the source image based at least in part on the color characteristic values; and
determine whether the source image is a non-product image based at least in part on the main color of the source image; wherein:
in the event that the main color is neither black nor white, the one or more processors are further configured to recognize the source image as a product image;
in the event that the main color is neither black nor white, the one or more processors are further configured to recognize the source image as a product image;
in the event that the main color is black or white, the one or more processors are further configured to:
divide the source image into nine image blocks of a 3×3 layout; and
recognize whether the source image is a non-product image according to the number of image blocks with a specific main color.

17. An image recognition system comprising:
one or more processors configured to:
obtain color characteristic values of pixels in a source image;
determine a main color of the source image based at least in part on the color characteristic values; and
determine whether the source image is a non-product image based at least in part on the main color of the source image; wherein:
in the event that the main color is neither black nor white, the one or more processors are further configured to recognize the source image as a product image;
in the event that the main color is neither black nor white, the one or more processors are further configured to recognize the source image as a product image;
in the event that the main color is black or white, the one or more processors are further configured to:
divide the source image into nine image blocks of a 3×3 layout; and
recognize whether the source image is a non-product image according to a relative position of an image block with a specific main color in the source image.

18. A computer program product for recognizing image, the computer program product being embodied in a non-transitory tangible computer readable storage medium and comprising computer instructions for:
obtaining color characteristic values of pixels in a source image;
determining a main color of the source image based at least in part on the color characteristic values; and
determining whether the source image is a non-product image based at least in part on the main color of the source image, including:
performing a preliminary determination of whether the source image is likely to be a non-product image based at least in part on the main color of the source image;

in the event that it is determined that the source image is likely to be a non-product image:
  dividing the source image into a plurality of image blocks;
  determining main colors of the respective image blocks; and
  determining whether the source image is a non-product image based at least in part on the main colors of the respective image blocks.

* * * * *